Nov. 4, 1947.  E. W. REMBERT  2,430,411
MANUFACTURE OF CEMENTITIOUS PIPE
Filed Sept. 4, 1942
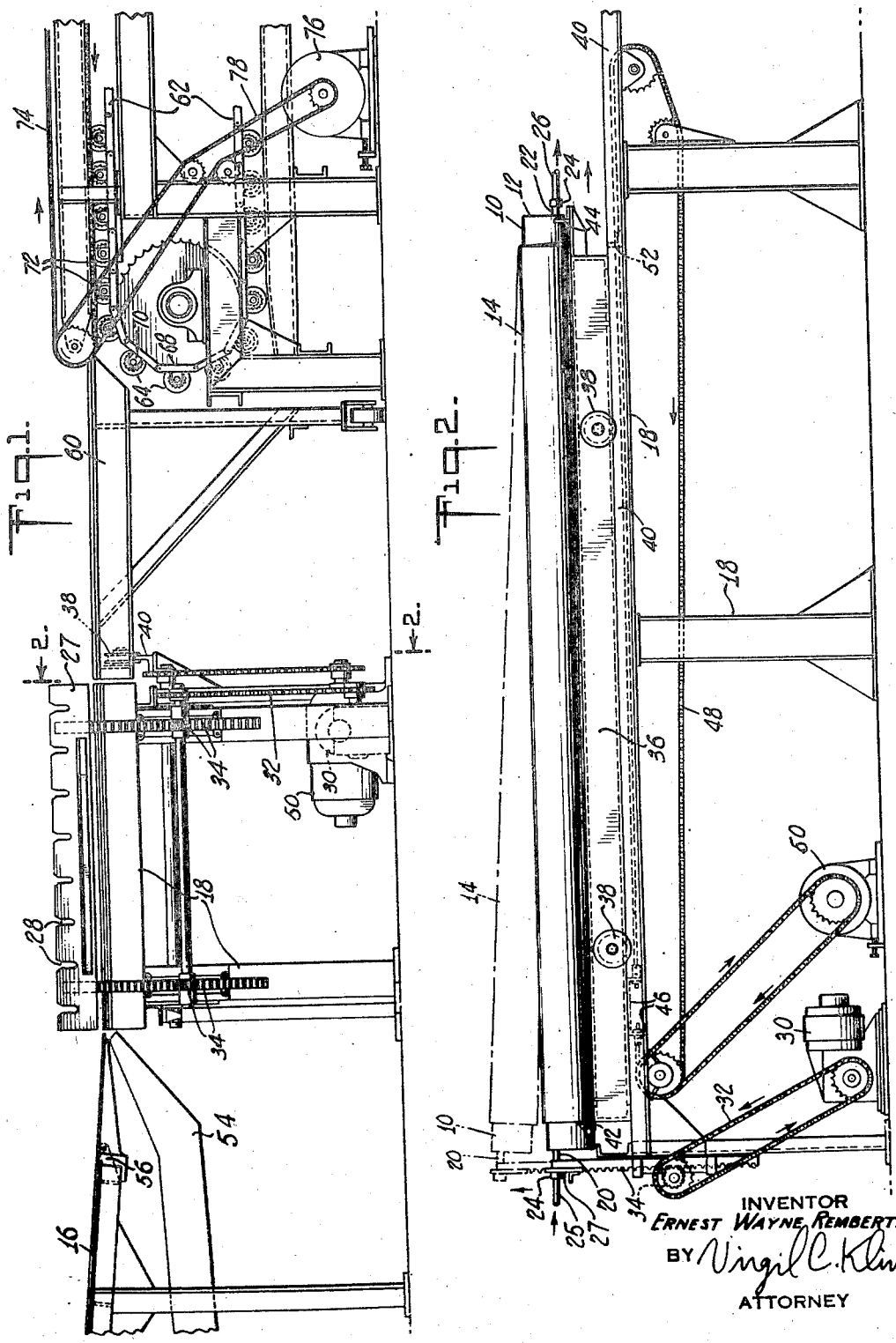
INVENTOR
ERNEST WAYNE REMBERT.
BY Virgil C. Kline
ATTORNEY Patented Nov. 4, 1947

2,430,411

UNITED STATES PATENT OFFICE 2,430,411

MANUFACTURE OF CEMENTITIOUS PIPE

Ernest Wayne Rembert, Plainfield, N. J., assignor to Johns-Manville Corporation, New York, N. Y., a corporation of New York Application September 4, 1942, Serial No. 457,290

5 Claims. (Cl. 92—67)

1

This invention relates to the manufacture of cementitious pipes and the like, and more particularly concerns improvements in method and apparatus for treating such pipes or other hollow ware after they have been formed from a pulp or plastic stock on a mandrel or mold.

The method and apparatus of the present invention were particularly designed for effecting rapid removal of wet or green asbestos-cement pipe from a forming mandrel and for subsequent handling of the pipe during a preliminary atmospheric curing operation. However, the invention is broadly applicable in principle to the manufacture of other wet molded and plastic tubular and hollow articles.

The conventional method of manufacturing asbestos-cement pipes is to wind a wet sheet of asbestos-cement pulp on a rotating, hollow mandrel while applying high pressure thereto. When a laminated pipe of suitable wall thickness has been formed, the mandrel is removed from the press and the formed pipe is then removed from the mandrel. The pipe is then subjected to air and steam curing or water curing operations to harden and strengthen it for subsequent use.

Because of the high pressure applied to the sheeted stock during the period of formation on the mandrel, no air is trapped at the interface between the wet pipe and the mandrel surface and a firm bond develops between the pipe and the mandrel. The conventional method in use for loosening and removing wet or green pipe from the mandrel consists in opening an air vent at each end of the pipe between the inside surface of the pipe and the outside surface of the mandrel, and subsequently calendering the pipe by further rotation of the mandrel to force air between the surfaces throughout the entire length of the pipe. This operation is generally effective for loosening the pipe from the mandrel, but often results in only partial loosening of the pipe while other portions stick to the mandrel, thereby developing cracks and strains in the pipe wall. Furthermore, this conventional method develops excessive structural deformations in the pipe, as well as non-uniformity in dimensions between pipes and between different sections of one pipe length. To overcome these difficulties, it has been necessary to build up the thickness of the pipe walls above the desired thickness and to subsequently machine the cured pipes to dimension them to the required tolerances necessary for the use of standard couplings and fittings.

A primary object of the present invention is to provide improved method and means adapted

2 for rapidly loosening cementitious pipe and the like from forming mandrels or molds in such a way as to produce pipe of greater uniformity of dimensions while economizing in the amount of material employed and effective pipe formed per unit of pipe manufactured.

Another object of the invention is to provide improved method and means for improving and simplifying the removal of green asbestos-cement pipe from a forming mandrel and for handling the pipe during a subsequent preliminary curing operation.

One method heretofore proposed for effecting separation of pipe from a forming mandrel was to coat the mandrel with oil or high melting point wax, and to subsequently form the pipe on this coated mandrel, with subsequent fusion of the coating to effect removal of the pipe. The thus-proposed method, however, was found to be impracticable because of the loosening of the pipe and consequent deformation during the period of formation on the mandrel. Almost invariably the deformation resulted in serious stretching of the pipe adjacent the ends thereof under the applied pressure.

The method of loosening green asbestos-cement pipe from a forming mandrel, which forms the subject of the present invention, is based on the discovery that when the mandrel is rapidly heated to a temperature above 212° F., a film of steam is generated at the pipe-mandrel interface and the slight stretching of the pipe thereby developed completely loosens the pressure bond between the pipe and the mandrel. Some expansion of the mandrel takes place during this heating operation, but such expansion is not sufficient to interfere with the development of a steam film or with the loosening action of such film with respect to the pipe. It is necessary that the development of a steam film be a rapid or flash operation in order to avoid the drying out or baking of the portion of the pipe surface which is in contact with the mandrel, with consequent development of a tighter adherent bond between the thus dried-out sections of the pipe and the mandrel. Pipes thus loosened from the mandrel by the rapid generation of a steam film at the interface are uniformly strong and free from cracks or other defects and are uniform in dimensions as between pipes and as between different sections of the same pipe. Furthermore, such pipes possess, on the average, a smoother inside surface than pipes made by the conventional method. It is possible to economize in the materials employed because the pipes can be formed to precise wall thickness dimension, since no substantial distortion takes place during the steam-film loosening method and the finished pipes fall within allowable tolerances for use with standard couplings and fittings.

With the above and other objects and features in view, the invention consists in the improved method and apparatus for manufacturing cementitious pipe and the like as hereinafter described and more particularly defined in the accompanying claims.

In the following description, reference will be made to the attached drawings, in which:

Fig. 1 is a view in vertical elevation of a preferred assembly of apparatus units in accordance with the present invention, such view including an end elevation of a pipe-mandrel stripping table, and a side elevation of the receiving end of an air-curing conveyor;

Fig. 2 is a side elevation of the tilting end of the pipe-mandrel stripping table of Fig. 1, taken on the line 2—2 of Fig. 1, showing a pipe-loaded mandrel in position for the stripping operation.

In the following specification, the invention will be particularly described with reference to the manufacture of asbestos and cement pipes, although it will be understood that the invention has broad application to the treatment of plastic hollow ware of tubular and non-tubular shape and composed of wet plastic materials other than asbestos-cement mixtures.

In manufacturing asbestos-cement pipes, an aqueous slurry furnish of asbestos fibres and cement is generally sheeted out by rotating a cylindrical screen mold in partially immersed position within the slurry to cause a layer or sheet of the asbestos-cement mixture to adhere to the periphery of the screen mold, excess water being filtered off through the screen perforations. By rotation of a machine belt in longitudinal bearing engagement with the periphery of the screen mold above the slurry bath, transfer is effected of the wet asbestos sheet from the periphery of the screen mold to the belt. Rotation of the belt carries the thus-formed asbestos-cement sheet over a suction box and thence into engagement with the periphery of the pipe-forming mandrel, effecting transfer of the asbestos-cement sheet to the mandrel. The mandrel is rotated to build up a laminated asbestos-cement pipe of suitable wall thickness, and, at the same time, the walls of the pipe thus formed are strongly compressed and further dewatered by the action of press rolls disposed in longitudinal bearing engagement with the forming mandrel. After a pipe of suitable dimensions has been formed, the pipe-loaded mandrel is released from pressure engagement by the belt and press rolls and is removed from the pipe-forming machine. At the same time, an empty mandrel is set into the thus-vacated mandrel bearings of the machine and brought into pipe-forming engagement with the belt and press rolls, so that very little time is lost in removing the mandrel and in replacing it with an empty mandrel preparatory to forming another pipe.

As previously indicated, conventional practice heretofore has generally involved an air vent and secondary calendering operation on the loaded mandrel after the pipe has been formed and before or after removal of the loaded mandrel from the machine, for the purpose of loosening the formed pipe from the mandrel. This practice has resulted in producing pipes of non-uniform dimensions and in spoiling a fairly high proportion of pipes of weakened structure subject to rejection, as heretofore explained. Moreover, the practice of calendering before removal from the machine has taken up too much of the time of the pipe-forming machine in the formation and loosening of a single pipe, thereby unduly limiting the pipe-making capacity of the machine.

According to the present invention, the step of loosening the formed green pipe from the mandrel is effected after the loaded mandrel has been removed from the machine and without substantial deformation of the pipe or weakening of the pipe structure. Consequently, pipes manufactured by the present invention can be formed on the mandrel to substantially precise dimensions, and a much higher proportion of the time of the pipe-forming machine can be utilized in the manufacture of movable pipe.

Referring to the accompanying drawings, the mandrels which are employed in the preferred practice of the invention are hollow steel cylinders 10 (Fig. 2) provided with end plate closures 12. Each mandrel is dimensioned with a diameter corresponding to the inside diameter of the pipe to be formed and with a length several inches greater than the length of the pipe, so that the loaded mandrel projects beyond the ends of the formed pipe. As a loaded mandrel is removed from the pipe-forming machine with the green pipe 14 strongly adhering to the periphery thereof, it may be immediately deposited on a take-off table 16 (Fig. 1), or the loaded mandrel may be transferred directly, along with other loaded mandrels, to the top of a mandrel-pipe stripping table 18. In addition to end closure plates 12, each mandrel is equipped at each end with short tubular fittings or nipples 20—22, and each fitting 20—22 in turn carries at its outer end a quick coupling sleeve 24 whereby steam or other heating fluid supply and removal hoses 25 and 26 can be quickly connected with the interior of the mandrel. In the drawings, fittings 20 are illustrated as inlet nipples and 22 are outlet nipples.

At one end of table 18, an elevator bar or plate 27 is mounted, the upper edge of said bar being provided with a plurality of horizontally spaced notches 28. The width of each notch 28 is designed to receive therein an inlet nipple 20 and to prevent sleeve coupling 24 from slipping therethrough. Consequently, each notch 28 in plate 27 provides an alignment socket for the inlet nipple 20 of a loaded mandrel and cooperates with the sleeve 24 on such fitting to provide a clamp whereby the mandrel is held in a stationary position on the table while the loosened pipe 14 is slipped endwise off the mandrel to the right, as viewed in Fig. 2.

After a plurality of loaded mandrels (for example 8) have been transferred from the pipe-forming machine to table 18 and arranged in parallel side-by-side position with sleeves 24 on inlet nipples 20 projecting beyond the notches 28 (Fig. 2), a steam supply manifold (or other source of high temperature heating fluid) is connected by quick coupling connections to each of the mandrels through sleeves 24 on nipples 20. At the same time, steam and condensate water withdrawal connections are made with the coupling sleeves on the outlet nipples 22 of each mandrel. During the period of admission of steam to each of the mandrels on the rack, the mandrels are preferably tilted at an angle to the horizontal (for example, an angle of 6°–12°) to facilitate drainage of condensate toward the fittings 22. This tilting of the loaded mandrels is effected by raising the plate 27 above its normal position (illustrated in full lines) to the dotted position shown in Fig. 2, such operation being effected by motor 30 through chain and sprocket drive 32 and rack and pinion elevator 34.

Elevator bar 27, and its associated rack and pinion unit 34, are mounted on the rigid frame of stripping table 18. However, the top portion of the table, on which the loaded mandrels rest during the stripping operation, is a movable carriage 36 having wheels or rollers 38 which are rotatably supported by horizontal, stationary side rails 40. The top pipe supporting surface of carriage 38 may be constructed of felt or other yieldable material to better protect the green pipe against injury. After the pipe has been loosened from the mandrel, preferably while in the tilted position shown by dotted lines in Fig. 2, it is returned to horizontal position, the steam supply and condensate removal couplings are broken at sleeves 24, and the pipe can be stripped from the mandrel by moving carriage 36 to the right, as viewed in Fig. 2, while restraining the mandrel from movement by means of sleeve 24 on fitting 20 engaging the sides of the slot in bar 27. To make sure that the loosened pipe 14 moves with the carriage, a stripping collar 42 is mounted on the top of the carriage in position to clear the mandrel while abutting that end of the pipe which adjoins the steam inlet end of the mandrel, with the pipe in stripping position shown in full lines in Fig. 2. A suitable collar 44 is mounted at the other end of the carriage to properly align the loaded mandrel on the top of the carriage. The forward end of carriage 36 is connected by one or more adjustable links 46 to a continuous drive chain 48. Chain 48 forms part of a chain and sprocket drive whereby the carriage can be reciprocated on its supporting rails 40 by means of power developed by an electrical motor 50.

After the loosened pipe has been stripped from the mandrel by movement of the carriage to the right, as viewed in Fig. 2, that end of the mandrel which is not supported by bar 27 may drop onto a cross brace 52 on rails 40, and from that position the empty mandrel may be removed from the stripping table and returned to the pipe-forming machine, using for this purpose a mandrel chute 54, for example. If chute 54 is thus employed, the lower end of take-off table 16 may be hingedly mounted (as at 56 in Fig. 1) to allow for its being lifted out of the way while empty mandrels are being returned via chute 54 from the stripping table to the pipe-forming machine (not shown).

After being stripped from the mandrel, the green pipes are transferred from carriage 36 to a transfer table 60; and from table 60, the green pipes are transferred to an air pre-curing conveyor 62. Conveyor 62 comprises essentially a continuous chain and roller conveyor in which each adjacent pair of rollers 64 forms a cradle for one of green pipes 14. Conveyor 62 may be actuated by a motor through chain and sprocket drives at its discharge end (not shown). The chain element of the conveyor is composed of hinged plate links 68, which are disposed in two spaced parallel chains. Each link carries a bearing 70, and rollers 64 are rotatably mounted between the chains on these bearings. On one end of each roller shaft, there is carried a sprocket 72 which is engaged by a continuous chain 74. Chain 74 is in turn powered from a motor 76 through a chain and sprocket drive 78. Assuming the chain 72 to be driven in a clockwise direction, sprockets 72 are rotated counter-clockwise, and there is imparted through the rollers 64 a slow clockwise rotation to the green pipe lengths cradled on the rollers throughout the period of their travel on the conveyor 62 toward the right, as viewed in Fig. 1. This slow rotation of the pipes during the preliminary curing period serves to maintain true roundness of the pipe during the period required for the cement to set.

Essentially the present invention is concerned with the problem of loosening the bond between the surface of a mandrel or mold and green, moist, hollow plastic ware shaped and compressed thereon; and the solution involves primarily the development of a thin film of gas (or vapor) at the interface between the surface of the mold and the shaped article so as to effect a uniform slight expansion of the article away from the mold surface. One method of developing such gas film in accordance with this invention is by electrolysis; namely, by impressing electric current across the pipe wall between the mandrel as one electrode and a metal screen as the other electrode, while rolling the loaded mandrel over the screen. A modification of the preferred method is that of electrically heating the mandrel to develop a temperature at or above 212° F. at the mandrel-pipe interface, thereby generating a thin film of steam at the interface by evaporation of water present in the walls of the green pipe adjacent the interface. A preferred method is that heretofore referred to, according to which steam or other hot fluid is circulated through the hollow mandrel in direct heat transfer contact with the walls of the mandrel, said heating fluid being preferably circulated at a temperature well above 212° F. (for example, at the temperature of steam of 40–80 lbs. gauge pressure) in order to develop quickly steam-generating temperatures of at least 212° F. at the mandrel-pipe interface. Since there is no trapped air at the pipe-mandrel interface, water can only be vaporized there by temperatures at or above the boiling point of the water at atmospheric pressure.

Tests which have been made using steam of 60–80 lbs. gauge pressure as the mandrel-heating medium show that green asbestos-cement pipes of conventional 2", 4", and 6" diameter sizes can be loosened from the mandrel and stripped therefrom by the method and apparatus herein described within a period of time ranging between less than two minutes up to 15 minutes after removal of the mandrel from the pipe-making machine. The average elapsed time between the end of the pipe-forming operation and the end of the stripping operation is nearer the minimum time figure given, since the apparatus is designed for rapid coupling of the steam supply and removal hoses and for rapid stripping of the pipe from the mandrel as soon as a loosening steam film has been generated at the pipe-mandrel interface. This average time per pipe can, of course, be substantially reduced by employing the apparatus described to heat and strip a plurality of loaded mandrels simultaneously.

Among the advantageous results of employing the method and apparatus of the present invention, one of the most important is that pipe can be made to substantially precise dimensions and close tolerances. Since loosening of the pipe from the mandrel results from developing a thin film of steam at the pipe-mandrel interface over the entire inner periphery of the pipe, the pipe lengths produced are more nearly round and of more nearly uniform outside and inside diameters throughout their length than pipes manufactured by conventional methods. Different pipes are of more nearly constant dimensions and have smoother inside surfaces than pipes produced by conventional methods. There is extremely slight circumferential stretching of the pipe when loosening is effected by heating of the mandrel in accordance with the present invention, so that the inside diameter of the finally cured pipe closely approximates the diameter of the mandrel. The thin film of steam which loosens the pipe from the mandrel also functions as a lubricant film permitting easy stripping of the loosened pipe from the mandrel with practically no frictional resistance.

In loosening and stripping pipe from mandrels by the present method, substantially no opportunity is afforded for developing wall cracks or structural strains. Moreover, the steam film loosening and stripping operation has been found to result in a considerable average increase in the strength of preliminarily cured pipe as compared to pipe similarly cured after loosening by conventional air venting and calendering practice. Manufacture of the pipe in accordance with the present method is, therefore, very efficient in producing a very low proportion of rejections for structural defects or weaknesses and for variations from dimensional tolerances. An added advantage previously referred to is that by the present invention the capacity of a pipe-making machine can be materially increased over conventional practice of air venting and calendering within the machine, since none of the machine time is taken up with this conventional method of loosening the formed pipe from the mandrel by air venting and calendering.

What I claim is:

1. In apparatus for manufacturing cementitious pipe by an operation which includes, building up the pipe under high pressure to desired wall thickness on a rotating hollow mandrel from an aqueous sheeted stock, the improvements comprising, end closures for the mandrel provided with fittings for circulating a heating fluid therethrough, a source of heating fluid, couplings for connecting said mandrel in circuit with said source, a reciprocable carriage adapted to support said pipe-loaded mandrel and to rapidly strip the pipe from the mandrel at the end of the heating operation, and mechanism including an elevator bar for holding the mandrel stationary during the stripping operation and to tilt the mandrel out of its normal horizontal position during the heating operation preceding the stripping operation, while the mandrel is supported by said carriage.

2. In manufacturing asbestos-cement pipe the steps comprising, forming a wet green pipe from thin sheet stock by building up laminations thereof on a rotating mandrel to desired wall thickness while strongly compressing the pipe walls to partially dewater the same and to prevent entrapment of air at the pipe-mandrel interface, rapidly heating the outer surface of the mandrel to a temperature above 212° F. and thereby rapidly generating a steam film at the interface by flash vaporization of moisture without substantial drying or hydration of the cement, utilizing the thus generated steam film to effect slight expansion of the pipe diameter and loosening of the pipe throughout its inner periphery, and promptly stripping the loosened pipe from the mandrel prior to substantial drying out of the pipe walls.

3. In manufacturing asbestos-cement pipe the steps comprising, forming a wet green pipe from sheet stock under strongly applied pressure on a hollow forming mandrel, rapidly heating the outer surface of the mandrel to a temperature above 212° F. by passing heating fluid through the mandrel at a temperature equivalent to that of steam under a pressure of at least 40 lbs. gauge and thereby rapidly generating a thin film of steam at the pipe-mandrel interface by flash vaporizing moisture, utilizing said steam film to slightly expand the pipe walls away from the heated mandrel surface thereby loosening the pipe from the mandrel, and promptly stripping the pipe from the mandrel.

4. In manufacturing asbestos-cement pipe the steps comprising, forming a wet green pipe from sheet stock under strongly applied pressure on a hollow forming mandrel, rapidly heating the outer surface of the mandrel to a temperature above 212° F. by circulating stem through the mandrel under a pressure of at least 40 lbs. gauge while simultaneously removing condensed water from the interior of the mandrel and thereby rapidly generating a thin film of steam at all portions of the pipe-mandrel interface by flash vaporizing moisture, utilizing said steam film to slightly expand the pipe walls away from the heated mandrel surface thereby loosening the pipe from the mandrel, and stripping the pipe from the mandrel within 15 minutes of the start of the heating operation.

5. In manufacturing asbestos-cement pipe the steps comprising, forming a wet green pipe from sheet stock under strongly applied pressure on a hollow forming mandrel, rapidly heating the outer surface of the mandrel by circulating steam therethrough under a pressure of at least 40 lbs. gauge while simultaneously removing condensed water from the interior of the mandrel by maintaining the pipe and mandrel inclined downwardly in the direction of steam flow and thereby rapidly generating a thin film of steam at all portions of the pipe-mandrel interface by flash vaporizing moisture, utilizing said steam film to slightly expand the pipe walls away from the heated mandrel surface thereby loosening the pipe from the mandrel, and promptly stripping the pipe from the mandrel.

ERNEST WAYNE REMBERT.

REFERENCES CITED

The following references are of record in the file of this patent:

UNITED STATES PATENTS

| Number | Name | Date |
|---|---|---|
| 1,363,912 | Pauly | Dec. 28, 1920 |
| 1,479,149 | Mattei et al. | Jan. 1, 1924 |
| 1,040,438 | Seigle | Oct. 8, 1912 |
| 782,354 | McFarland | Feb. 14, 1905 |
| 539,777 | Peters | May 21, 1895 |
| 1,234,701 | Parker | July 24, 1917 |
| 1,225,091 | Whitcome | May 8, 1917 |
| 2,154,844 | Harker et al. | Apr. 18, 1939 |
| 1,322,813 | Parker | Nov. 25, 1919 |
| 1,916,840 | Keller | July 4, 1933 |